US011693651B1

(12) United States Patent
Balber et al.

(10) Patent No.: US 11,693,651 B1
(45) Date of Patent: *Jul. 4, 2023

(54) STATIC AND DYNAMIC CORRELATION OF SOFTWARE DEVELOPMENT PIPELINE EVENTS

(71) Applicant: CyberArk Software Ltd., Petach-Tikva (IL)

(72) Inventors: Michael Balber, Petach-Tikva (IL); Shai Dvash, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,856

(22) Filed: Nov. 10, 2022

Related U.S. Application Data

(63) Continuation-in-part of application No. 17/731,738, filed on Apr. 28, 2022, now Pat. No. 11,500,985.

(51) Int. Cl.
*H04L 9/40* (2022.01)
*G06F 8/70* (2018.01)

(52) U.S. Cl.
CPC .............. *G06F 8/70* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 2012/0198413 A1* | 8/2012 | Dang | G06F 8/30 717/101 |
| 2014/0059211 A1* | 2/2014 | Alapati | G06F 11/3082 709/224 |
| 2014/0280245 A1* | 9/2014 | Wilson | G06F 21/552 707/758 |
| 2016/0308888 A1* | 10/2016 | Vargas Gonzalez | G06F 21/56 |
| 2018/0365126 A1* | 12/2018 | Edwards | G06F 11/3612 |
| 2022/0198013 A1* | 6/2022 | Raizman-Kedar | G06F 21/566 |

* cited by examiner

*Primary Examiner* — Joseph P Hirl
*Assistant Examiner* — Hassan Saadoun
(74) *Attorney, Agent, or Firm* — Finnegan, Henderson, Farabow, Garrett & Dunner, LLP

(57) ABSTRACT

Disclosed embodiments relate to systems and methods for correlating software pipeline events. Techniques include receiving first data representing at least one aspect of a first software pipeline event; identifying a value as a potential identifier of the first software pipeline event; storing the value in a data structure in an associative manner with the first software pipeline event; receiving second data representing at least one aspect of a second software pipeline event; identifying an additional value as a potential identifier of the second software pipeline event; comparing additional value to the value stored in the data structure; based on the comparison, determining whether a correlation exists between the first software pipeline event and the second software pipeline event; and based on a determination that a correlation exists, providing an indication of the correlation.

23 Claims, 8 Drawing Sheets

STATIC AND DYNAMIC CORRELATION OF SOFTWARE DEVELOPMENT PIPELINE EVENTS

CROSS-REFERENCE TO RELATED APPLICATIONS

The present application is a continuation-in-part of, and claims the benefits of priority to, U.S. application Ser. No. 17/731,738, filed on Apr. 28, 2022, which is incorporated by reference herein in its entirety.

BACKGROUND

Technical Field

The present disclosure relates generally to cybersecurity associated with a software development pipeline and, more specifically, to techniques for continuously and reliably correlating software development events within the pipeline.

Background Information

In the field of cybersecurity, the software supply chain has become a significant attack vector for malicious actors. The scale and frequency of supply chain attacks have grown at an alarming rate. For example, in these supply chain attacks, malicious actors may take advantage of various vulnerabilities in connections between tools involved in the software development pipeline. These attack points may be leveraged to modify software in the development phase and these modifications may be carried through to deployed software in production. Accordingly, individuals and organizations are increasingly looking to bolster the security not only of their code itself, but of the continuous integration and continuous delivery (CI/CD) pipelines used to develop the code.

One way of protecting against these supply chain attacks is to monitor events from various tools used in the software development pipeline. Accordingly, before a piece of code is deployed to production, a verification can be performed to ensure that the code was developed through the proper chain of events. This validation, however, can be difficult or impossible using conventional techniques. For example, the software development pipeline may include events performed using many different tools provided by different vendors. Each vendor may use different identifiers to reference the same code segment and may represent events in different ways. Therefore, correlating these different events among different vendors is often infeasible.

Accordingly, in view of these and other deficiencies in existing techniques, technological solutions are needed for correlating software pipeline events between multiple vendors. In particular, solutions should advantageously provide techniques for continuously correlating events within a software development pipeline in a reliable manner. Further, the solutions should be performed dynamically so as to not interrupt normal development of software or interfere with the deployment of applications.

SUMMARY

The disclosed embodiments describe non-transitory computer readable media, systems, and methods for correlating software pipeline events. For example, in an embodiment, a non-transitory computer readable medium may include instructions that, when executed by at least one processor, cause the at least one processor to perform operations for correlating software pipeline events. The operations may comprise receiving an indication of a first software pipeline event, the indication of the first software pipeline event including first data representing at least one aspect of the first software pipeline event; identifying at least one value as a potential identifier of the first software pipeline event; storing the at least one value in a data structure in an associative manner with the first software pipeline event; receiving an indication of a second software pipeline event correlated with the first software pipeline event, the indication of the second software pipeline event including second data representing at least one aspect of the second software pipeline event; identifying at least one additional value as a potential identifier of the second software pipeline event; comparing the at least one additional value to the at least one value stored in the data structure; based on the comparison between the at least one value and the at least one additional value, determining whether a correlation exists between the first software pipeline event and the second software pipeline event; and based on a determination that a correlation exists, providing an indication of the correlation.

According to a disclosed embodiment, the indication of the first software pipeline event may be based on a custom HTTP callback.

According to a disclosed embodiment, the indication of the first software pipeline event may be received from an agent executing on a computing device of the network identity associated with the first software pipeline event.

According to a disclosed embodiment, the indication of the first software pipeline event may be received from the agent through an API call.

According to a disclosed embodiment, the agent may be running in a virtual computing instance executing a code segment.

According to a disclosed embodiment, the first software pipeline event may include creation of a credential by a network identity.

According to a disclosed embodiment, the credential may be a token.

According to a disclosed embodiment, the at least one value may be at least one of a name of the credential or an identifier of the credential.

According to a disclosed embodiment, the second software pipeline event may include a use of the credential.

According to a disclosed embodiment, the use of the credential may include using the credential to access a privileged resource using the credential.

According to a disclosed embodiment, the at least one additional value may include a name of the privileged resource.

According to a disclosed embodiment, the first software pipeline event may include a change in a security configuration of a privileged resource.

According to a disclosed embodiment, the second software pipeline event may include access to the privileged resource within a predetermined timeframe of the change in the security configuration.

According to a disclosed embodiment, the first software pipeline event may include an installation of at least one of an executable or a dependency.

According to a disclosed embodiment, the second software pipeline event may include an operation performed by the executable.

According to a disclosed embodiment, the first software pipeline event may be associated with a first source and identifying the at least one value may include determining that the at least one value is not included in data representing at least one additional software pipeline event associated with the first source.

According to another disclosed embodiment, there may be a computer-implemented method for correlating software pipeline events. The method may comprise receiving an indication of a first software pipeline event, the indication of the first software pipeline event including first data representing at least one aspect of the first software pipeline event; identifying at least one value as a potential identifier of the first software pipeline event; storing the at least one value in a data structure in an associative manner with the first software pipeline event; receiving an indication of a second software pipeline event correlated with the first software pipeline event, the indication of the second software pipeline event including second data representing at least one aspect of the second software pipeline event; identifying at least one additional value as a potential identifier of the second software pipeline event; comparing the at least one additional value to the at least one value stored in the data structure; based on the comparison between the at least one value and the at least one additional value, determining whether a correlation exists between the first software pipeline event and the second software pipeline event; and based on a determination that a correlation exists, providing an indication of the correlation.

According to a disclosed embodiment, the at least one value may include at least a first value and a second value, and comparing the at least one additional value to the at least one value stored in the data structure may include comparing the at least one additional value to the first value and the second value stored in the data structure.

According to a disclosed embodiment, the method may further comprise discarding the second value based on the correlation between the first software pipeline event and the second software pipeline resulting from the comparison between the first value and the additional value.

According to a disclosed embodiment, the method may further comprise performing at least one control action based on the determination that a correlation exists.

According to a disclosed embodiment, the control action may include at least one of generating a report indicating the correlation exists or triggering an alert.

According to a disclosed embodiment, the first software pipeline event may include creation of a credential by a network identity, and the second software pipeline event may include a use of the credential by the network identity.

According to a disclosed embodiment, the control action may include at least one of revoking a privilege of the network entity or performing a validation of the credential.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
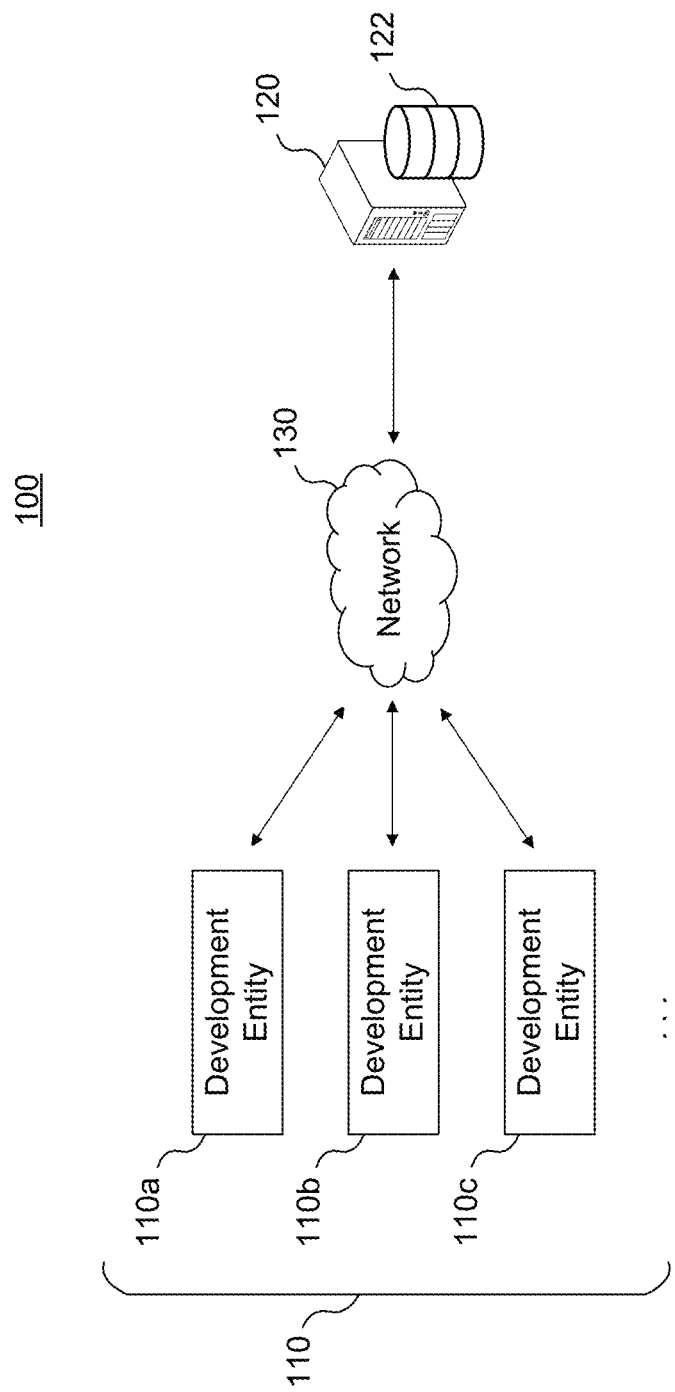
FIG. 1 illustrates an example system environment for monitoring and correlating software pipeline events, consistent with the disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques for correlating software pipeline events described herein overcome several technological problems relating to security, efficiency, and performance in the fields of cybersecurity and software development. In particular, the disclosed embodiments provide techniques for dynamically and reliably correlating software pipeline events from different vendors. As discussed above, software supply chain attacks are a growing concern in the field of cybersecurity. To help prevent such attacks, it may be beneficial to monitor a chain of events associated with a code segment before it is deployed into a production environment. This may include validating the code segment by evaluating a chain of events associated with the development of the code through the software development pipeline. Accordingly, a system may be able to identify any attack points where malicious code may have been inserted.

However, a typical software development pipeline may involve many different vendors or other entities. This may include vendors associated with a source control phase, in which developers prepare code and commit it to a source code vendor, build vendors used to compile components of code from a repository into an executable file, testing and packaging vendors used to test compiled code, or the like. Each vendor may refer to a particular code segment using their own unique identifiers. Further each vendor may represent events using event data having different formats. Accordingly, it may be difficult or impossible to correlate events represented in different formats and different identifiers in an automated and reliable manner. For example, a security server may not know which identifiers from one vendor correspond to other identifiers from another vendor used to refer to the same code segment. Moreover, it may be difficult to isolate which portions of event data are identifiers, and which portions are other operating data representing the event.

The disclosed embodiments provide technical solutions to overcome these and other problems with the current techniques. In particular, the disclosed embodiments may access event data representing a software pipeline event and may extract text or other values from the event data that may be potential identifiers. For example, this may include searching for unique values within event data that does not appear in other event data from the same vendor (i.e., a development entity), which may indicate the value is a unique identifier of the associated code segment. Any extracted potential identifiers may be stored in a data structure (e.g., a database) for later reference. As additional event data is received, the disclosed embodiments may identify a match between values in the new event data with values stored as potential identifiers from previous event data. If the same value appears in event data across multiple vendors, this may indicate that the value is an identifier. Accordingly, a correlation may be determined between the events from multiple vendors and the progress of a particular code segment may be traced through the software development pipeline.

Reference will now be made in detail to the disclosed embodiments, examples of which are illustrated in the accompanying drawings.

FIG. 1 illustrates an example system environment 100 for monitoring and correlating software pipeline events, consistent with the disclosed embodiments. System environment 100 may include one or more development entities 110 and one or more servers 120, as shown in FIG. 1. System environment 100 may represent a system or network environment in which software or portions of software are developed and deployed. For example, system environment 100 may be associated with a continuous delivery (CD) software development practice in which code change are automatically built, tested, and prepared for production release. This may be a distributed process, such that development entities 110 are used to develop or modify deployed software during production. For example, the software development process may be orchestrated using tools such as GitHub™, GitLab™, BitBucket™, AWS CodeCommit™, or others. Server 120 may be configured to monitor and/or analyze software pipeline events associated with development entities 110 and correlate events that are associated with the same software code.

The various components of system 100 may communicate over a network 130. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system environment 100 is shown as a network-based environment, it is understood that in some embodiments, one or more aspects of the disclosed systems and methods may also be used in a localized system, with one or more of the components communicating directly with each other.

As noted above, system 100 may include one or more development entities 110. For example, this may include development entities 110a, 110b, and 110c, as indicated in FIG. 1. As used herein, a development entity may refer to any device or entity operative to perform one or more tasks associated with the development of software code. Accordingly, development entities 110 may include any form of computer-based device or entity that may be used to perform, manage, or track a software development action. In some embodiments, development entities 110 may be a personal computer (e.g., a desktop or laptop computer), a mobile device (e.g., a mobile phone or tablet), a wearable device (e.g., a smart watch, smart jewelry, implantable device, fitness tracker, smart clothing, head-mounted display, etc.), an IoT device (e.g., smart home devices, industrial devices, etc.), or any other device that may be capable of performing a software development action. For example, one or more of development entities may include a workstation used by a developer to write, inspect, or update code. In some embodiments, development entities 110 may be a virtual machine (e.g., based on AWS™, Azure™, IBM Cloud™, etc.), container instance (e.g., Docker™ container, Java™ container, Windows Server™ container, etc.), or other virtualized instance.

In some embodiments, development entities 110 may be associated with third party vendors used as tools for managing a particular aspect of a software development pipeline. For example, one or more of development entities 110 may be associated with a source control system, such as GitHub™, GitLab™, BitBucket™ AWS CodeCommit™ or other systems allowing users to code and commit software. As another example, one or more of development entities 110 may be associated with build machines or vendors, such as Jenkins™, CircleCI™, AWS CodeBuild™, or other build automation vendors. In some embodiments, one or more of development entities 110 may be associated with artifact servers, such as JFrog Artifactory™, Amazon™ Elastic Container Registry (ECR)™, ProGet™, or other artifact management tools. Development entities 110 may be associated with various other vendors, software, or tools provided as part of a software development pipeline. Accordingly, development entities 110 may represent an interface with a software package, which may include web- or cloud-based software, local software, or both. Server 120 may therefore be configured to access data associated with software development pipeline events through development entities 110.

Server 120 may include any form of remote computing device configured to monitor, analyze, or otherwise manage one or more aspects of software development. For example, server 120 may be a server configured to monitor software development events occurring at various stages of a software development pipeline and correlate events associated with the same software or code. As described above, this may allow server 120 or other components of system 100 to validate an artifact or other software development byproducts prior to deployment. In some embodiments, server 120 may perform various security functions associated with software development. For example, server 120 may be configured to detect anomalies associated with the development of an artifact, enforce a security policy, generate reports or alerts, forego or prevent deployment, or various other security functions as described in greater detail below. In some embodiments, Server 120 may be implemented as a Software as a Service (SaaS) platform through which artifacts or software events may be monitored. Server 120 may include various other computing devices, such as a mobile device (e.g., a mobile phone or tablet), a wearable device (a smart watch, smart jewelry, implantable device, fitness tracker, smart clothing, or head-mounted display, etc.), an IoT device (e.g., a network-connected appliance, vehicle, lighting, thermostat, room access controller, building entry controller, parking garage controller, sensor device, etc.), a gateway, switch, router, portable device, virtual machine, or any other device that may perform computing operations associated with software development. In some embodiments, server 120 may include or access a database 122 configured to store various data associated with software pipeline events.

Figure 2:
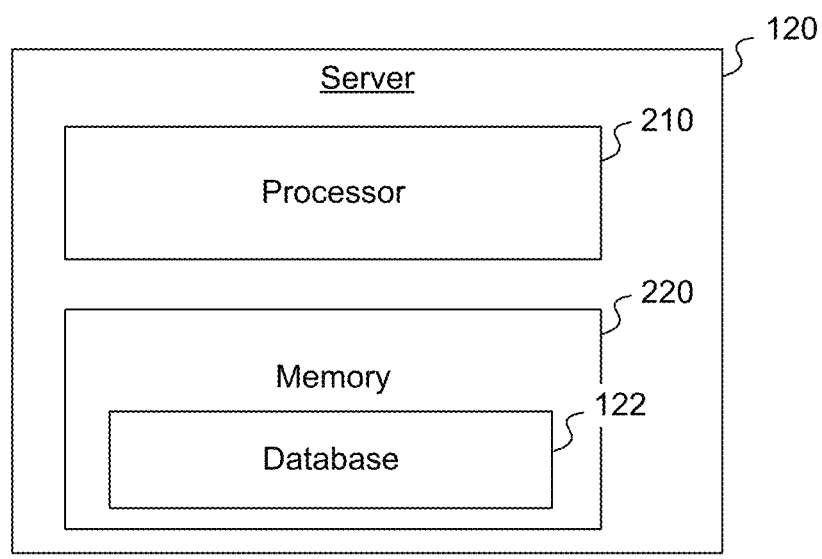
FIG. 2 is a block diagram showing an example server, consistent with the disclosed embodiments.

FIG. 2 is a block diagram showing an example server 120, consistent with the disclosed embodiments. As described above, server 120 may be a computing device (e.g., a server, etc.) and may include one or more dedicated processors and/or memories. For example, server 120 may include a processor (or multiple processors) 210, and a memory (or multiple memories) 220, as shown in FIG. 2.

Processor 210 may take the form of, but is not limited to, a microprocessor, embedded processor, or the like, or may be integrated in a system on a chip (SoC). Furthermore, according to some embodiments, processor 210 may be from the family of processors manufactured by Intel®, AMD®, Qualcomm®, Apple®, NVIDIA®, or the like. The processor 210 may also be based on the ARM architecture, a mobile processor, or a graphics processing unit, etc. The disclosed embodiments are not limited to any particular type of processor configured in server 120.

Memory 220 may include one or more storage devices configured to store instructions used by the processor 210 to perform functions related to server 120 described herein. The disclosed embodiments are not limited to particular software programs or devices configured to perform dedicated tasks. For example, the memory 220 may store a single program, such as a user-level application, that performs the functions associated with the disclosed embodiments, or may comprise multiple software programs. Additionally, the processor 210 may, in some embodiments, execute one or more programs (or portions thereof) remotely located from server 120. Furthermore, memory 220 may include one or more storage devices configured to store data for use by the programs. Memory 220 may include, but is not limited to a hard drive, a solid state drive, a CD-ROM drive, a peripheral storage device (e.g., an external hard drive, a USB drive, etc.), a network drive, a cloud storage device, or any other storage device.

In some embodiments, memory 220 may include a database 122 as described above. Database 122 may be included on a volatile or non-volatile, magnetic, semiconductor, tape, optical, removable, non-removable, or other type of storage device or tangible or non-transitory computer-readable medium. Database 122 may also be part of server 120 or separate from server 120. When database 122 is not part of server 120, server 120 may exchange data with database 122 via a communication link. Database 122 may include one or more memory devices that store data and instructions used to perform one or more features of the disclosed embodiments. Database 122 may include any suitable databases, ranging from small databases hosted on a work station to large databases distributed among data centers. Database 122 may also include any combination of one or more databases controlled by memory controller devices (e.g., server(s), etc.) or software. For example, database 122 may include document management systems, Microsoft SQL™ databases, SharePoint™ databases, Oracle™ databases, Sybase™ databases, other relational databases, or non-relational databases, such as mongo and others.

Figure 3:
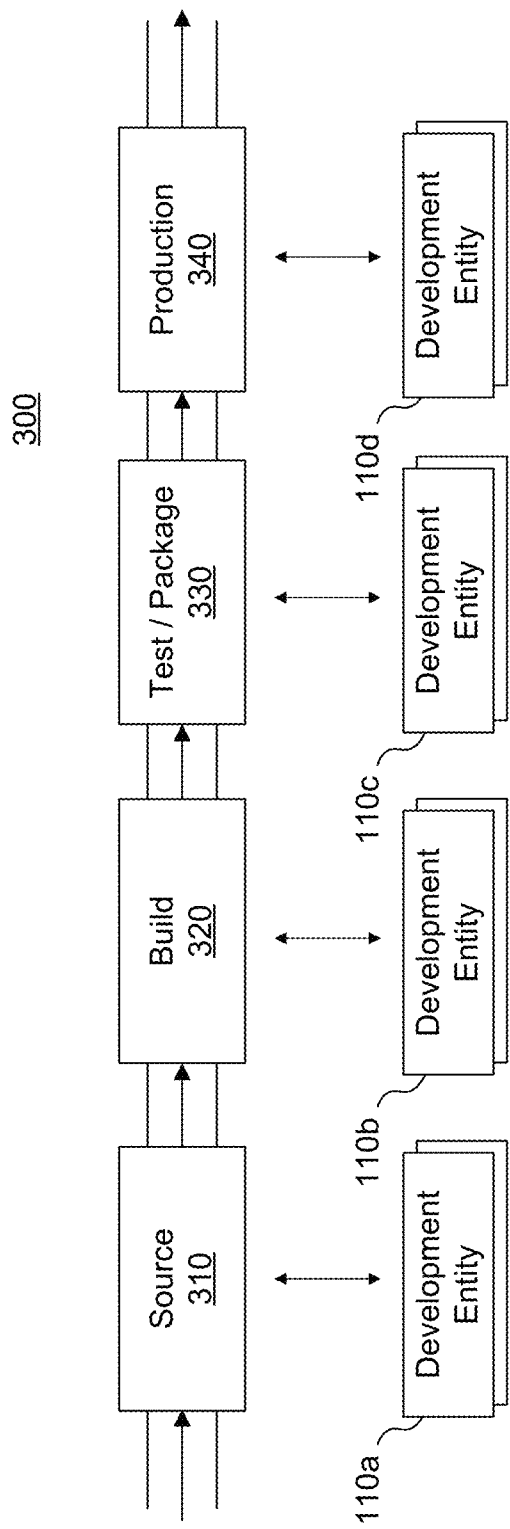
FIG. 3 is a block diagram showing an example software development pipeline, consistent with the disclosed embodiments.

FIG. 3 is a block diagram showing an example software development pipeline 300, consistent with the disclosed embodiments. Software development pipeline 300 may represent a series of automated processes for advancing new code additions and updates, such as from version control to production. Software development pipeline 300 may include various phases, such as source phase 310, build phase 320, testing and packaging phase 330, and production phase 340. In some embodiments, software development pipeline 300 may be a Continuous Delivery/Deployment (CI/CD) pipeline as described above, also referred to as a "software supply chain," and may represent an automated process for building, testing, and deploying software. Server 120 may be configured to monitor various phases of software development pipeline 300 and correlate events at various phases, as described in further detail below.

Source phase 310 may be an initial phase of software development pipeline 300 and may represent a phase at which source code is committed to a source control system. Source phase 310 may be associated with a development environment in which changes to software are developed. For example, this may include the development of code at a workstation of one or more developers. Once a developer has completed writing a new code addition and committed it to a source control repository, such as GitHub™ or the like, subsequent phases of software development pipeline 300 may be triggered. Source phase 310 may be associated with one or more development entities 110a, as shown in FIG. 3. Development entities 110a may include various source control systems, such as GitHub™, GitLab™, BitBucket™, AWS CodeCommit™, or other systems allowing users to code and commit software.

Build phase 320 may represent a phase during which source code files are converted into standalone software artifacts that can be run or executed on a computer. In other words, build phase 320 may represent a phase of software development pipeline 300 at which source code is pushed to a build machine. Accordingly, build phase 320 may be associated with one or more development entities 110b, as shown in FIG. 3. For example, development entities 110b may include build machine tools, such as Jenkins™, Azure DevOps™, CircleCI™, or the like.

Testing and packaging phase 330 may be a phase in which code is deployed to a testing environment for testing purposes. The testing environment may mirror an actual production environment as closely as possible to test various scripts and procedures before they are deployed to a production environment. In some embodiments, the testing environment may connect to other production services and data, such as databases or the like. As with other phases of software development pipeline 300, testing and packaging phase 330 may be associated with one or more development entities 110c, as shown in FIG. 3. For example, development entities 110c may include build machine tools, such as code scanners (e.g., Snyk™; CheckMarx™ etc.), artifact managers (e.g., JFrog™ Docker Hub™; AWS ECR™), Worksoft™, Tricentis™ Codeship™ or the like.

Production stage 340 may represent a stage in which code is deployed, for example, to public servers in a production environment. As an illustration, this may include deploying new code directly (e.g., by overwriting existing code) or by deploying a configuration change. In some embodiments, this may include various security assessments, such as validation that the code progressed through software development pipeline 300 properly (e.g., tracing a chain of events associated with the code), enforcing a security policy, detecting anomalies or the like. For example, this may include various security functions performed by server 120, as described in further detail below. In some embodiments, production phase 340 may be associated with various development identities 110*d*, as shown in FIG. 3. For example, development identities 110*d* may be associated with various production support vendors or tools, which may include cloud vendors (e.g., AWS™, Azure™, IBM Cloud™, etc.), on-premises or local servers, a software deployment automation system (e.g., Kubernetes™, etc.), or the like.

Server 120 may monitor various events associated with software development pipeline 300. For example, this may include interfacing with development entities 110*a*, 110*b*, 110*c*, and/or 110*d* to access event data representing software development events. In some embodiments, this may include events at which source code is committed to a source control system, source code being pushed to a build machine, a binary file being sent to an artifact server, or the like. While software development pipeline 300 is provided by way of example, software development pipeline 300 may include various other stages in place of or in addition to the phases shown in FIG. 3. For example, this may include development phases, testing phases, version control phases, acceptance testing, or other phases, which may include variations in terminology or approaches. Accordingly, the disclosed embodiments, are not limited to any particular phases or events associated with software development, and may be used with any data representing events associated with software development.

To correlate various events associated with the same code, server 120 may be configured to locate and extract identifiers from data representing the events. For example, each of a plurality of development entities (e.g., tools, vendors, etc.) may perform or allow users to perform various events at different stages of software development pipeline 300. Each of the development entities may use a unique identifier associated with a particular piece of code. Because each development entity may be associated with a different company or vendor, each of the development entities may refer to the same code segment using their own identifiers. Accordingly, in order to create unified traces of pipeline executions that can be monitored and secured against malicious actors, server 120 may be configured to extract unique identifiers from event data and correlate identifiers from multiple development identities to the same code segment. As a result of this correlation, the progress of a particular code segment may be traced throughout software development pipeline 300.

This correlation can occur in various ways, depending on the particular implementation. In some embodiments, server 120 may perform a static correlation of events, in which the relationships between multiple unique identifiers of various development entities may be drawn from the text of event data. For example, the event data may have predefined fields containing unique identifiers, or predefined formats for identifiers. Based on the predefined field or formats, server 120 may identify text in event data representing one or more unique identifiers. In some embodiments, event data from one development entity may reference the unique identifier of another development entity within event data text. For example, a source control solution, such as GitHub™ may generate data indicating source code was committed to the system and the event data may include a "commit id" or "commit hash," which may be assigned to a code changeset. A subsequent event, such as an event from a build server, may contain the "commit id" along with another unique "build id" (and possibly an "artifact id," etc.). Based on the "commit id" and "build id" being included in the same event data (or the same field, etc.), server 120 may determine a correlation between the "commit id" and "build id" indicating these identifiers reference the same code segment.

Figure 4:
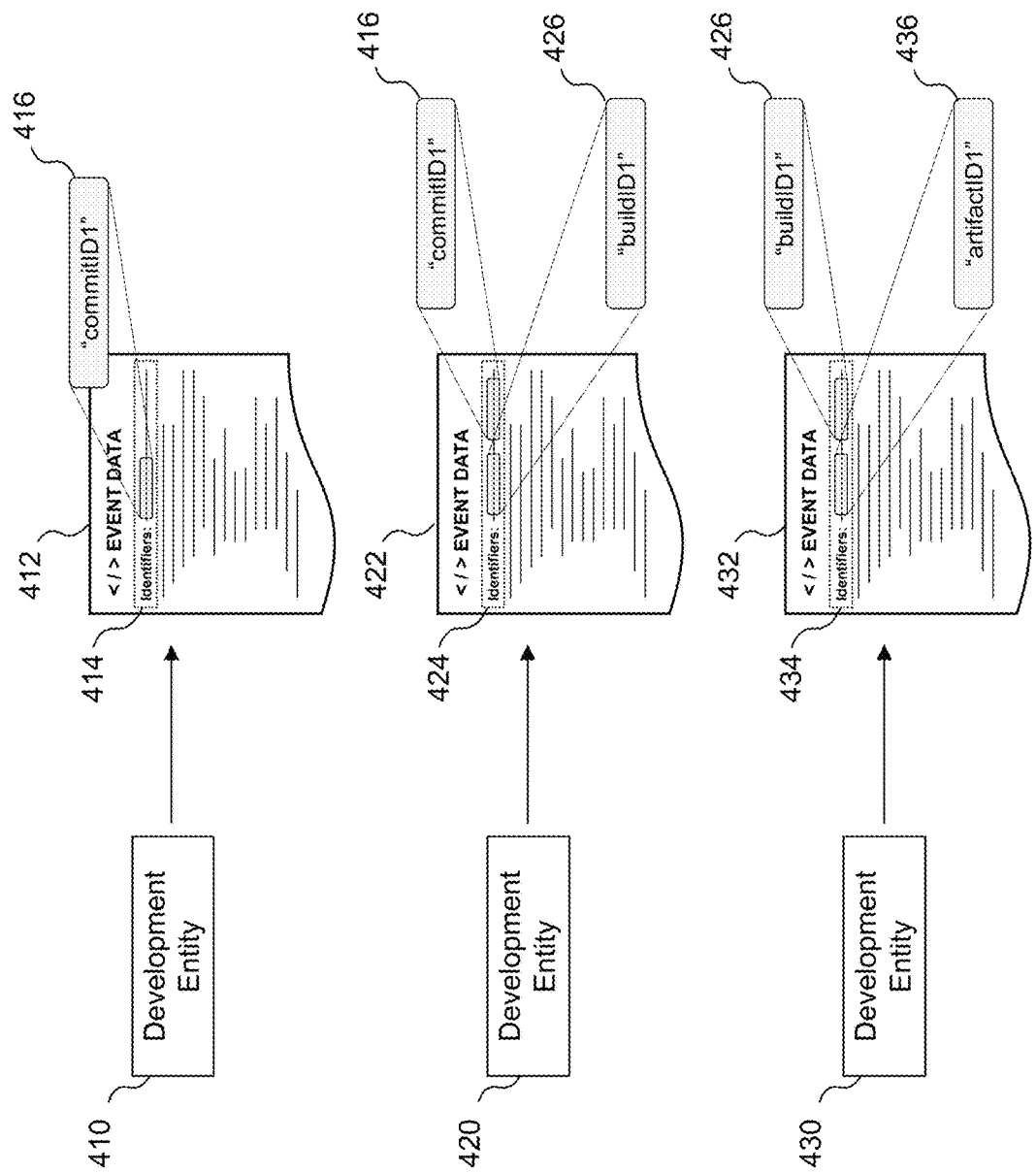
FIG. 4 is a diagrammatic illustration of an example static correlation of software development pipeline events, consistent with the disclosed embodiments.

FIG. 4 is a diagrammatic illustration of an example static correlation of software development pipeline events, consistent with the disclosed embodiments. FIG. 4 may represent various actions performed by server 120 for correlating events from multiple development entities. For example, this may include correlating event data 412, 422, and 432 associated with development entities 410, 420, and 430, respectively. Development entities 410, 420, and 430 may each correspond to one of development entities 110*a*, 110*b*, 110*c*, or 110*d*, as described above. Accordingly, each of development entities 410, 420, and 430 may correspond to different phases of software development pipeline 300. Alternatively or additionally, two or more of development entities 410, 420, and 430 may correspond to the same phase of software development pipeline 300.

As indicated in FIG. 4, server 120 may receive event data 412 representing a software pipeline event associated with development entity 410. In some embodiments, this may include receiving event data 412 from development entity 410 through network 130. This may include any other means for accessing data such as retrieving it from storage associated with development entity 410. For example, server 120 may receive some indication that a software pipeline event has occurred, and may retrieve event data 412 based on the indication.

As used herein, a software pipeline event may include any event associated with the development of software or a portion of software (e.g., a code segment, etc.). This may include any of the various events described herein that occur along software development pipeline 300. For example, this may include an event such as source code being committed to a source code vendor, source code being pushed to a build server, a file being sent to an artifact server, or the like. Event data may include any data memorializing or otherwise representing a software pipeline event. For example, this may include an event log, code revision data, an event description, or any other data generated or stored in association with a software pipeline event.

Server 120 may analyze event data 412 to identify at least one identifier 416 within event data 412. In some embodiments, event data may include a designated field, such as field 414, or another predefined location at which identifier 416 can be found. Alternatively or additionally, event data 412 may represent identifier 416 using a predefined format (e.g., a prefix or suffix) or another indicator to assist server 120 in locating identifier 416. In this example, development entity 410 may be a source control system (e.g., as part of source phase 310) and identifier 416 may be a commit ID associated with a code segment. Accordingly, identifier 416 may have a value of "commitID1." It is to be understood that this value is provided by way of example, and various other forms of identifiers may be used.

Development entity 420 may be associated with a subsequent event associated with the same code segment as event data 412. This subsequent event may be represented by event data 422, as shown in FIG. 4. In some embodiments, development entity 420 may be associated with a different phase of software development pipeline 300 than development entity 410. For example, development entity 420 may be associated with a build vendor (e.g., in association with build phase 320 of software development pipeline 300). Accordingly, event data 422 may be a different type or format than event data 412. As with event data 412, server 120 may be configured to extract one or more identifiers from event data 422. This may include extracting data from a designated field 424, as described above.

Event data 422 may include an identifier 426 used by development entity 420 to identify the code segment. Because development entity 420 is different from development entity 410, identifier 426 may be different than identifier 416. For example, development entity 420 may use a unique identifier "buildID1" to represent the code segment. In some embodiments, event data 422 may also include identifier 416, as shown. For example, a build server may contain a identifier for the event (e.g., identifier 426) along with one or more correlation identifiers, such as a commit ID or commit hash. In some embodiments, identifier 416 may be included in field 424 and therefore may be identified by server 120 along with identifier 426. Alternatively or additionally, server 120 may search for identifier 416 specifically. Based on the inclusion of both identifier 416 and identifier 426, server 120 may determine a correlation between identifier 416 and identifier 426, and therefore may determine a correlation between events represented by event data 412 and 422.

As shown in FIG. 4, server 120 may receive indications of additional events associated with the same code segment. For example, this may include an event represented by event data 432, which may be associated with development entity 430. Server 120 may identify one or more identifiers, such as identifiers 436 and 426. For example, this may include extracting identifiers from field 434, as shown. In this example, development entity 430 may be associated with an artifact server and identifier 436 may be a name or other identifier of an artifact, such as "artifactID1." Similar to event data 422, event data 432 may also include correlation identifiers, such as identifier 426. Based on the inclusion of identifier 426 in event data 432, server 120 may determine a correlation between identifiers 436 and 426. Accordingly, an event represented by event data 432 may also be associated with events represented by event data 422 and 412.

Based on the correlation of events represented by event data 412, 422, and 432, server 120 may identify a chain or trace of pipeline executions along software development pipeline 300 associated with the code segment. This may facilitate validation of the code segment prior to deployment, as described further below. It is to be understood that the event data illustrated in FIG. 4 is provided by way of example, and the same or similar techniques may be applied for various other forms of event data. For example, event data 422 may additionally include identifier 436, which may allow server 120 to determine the correlation between events represented by event data 412, 422, and 432. Further, server 120 may perform similar techniques with more or fewer events than shown in FIG. 4.

In some embodiments, event data may not necessarily include designated fields for identifiers or the fields may not be easily identified by server 120. For example, each development entity may be associated with a different vendor, which may use different formats of identifiers, and/or may use the identifiers within event data in different ways. To account for these differences in event data between development entities, server 120 may be configured to dynamically identify potential identifiers from within event data and monitor other event data from other development entities to look for these potential identifiers. For example, server 120 may search for terms in event data that do not appear in other event data from the same development entity, and may store these terms as potential identifiers. If these terms appear in event data from other development entities, server 120 may conclude that the terms represent identifiers, and a correlation between events may be determined. Accordingly, even if event identifiers are not represented in a structured manner, server 120 may be enabled to trace the development of a particular code segment.

Figure 5:
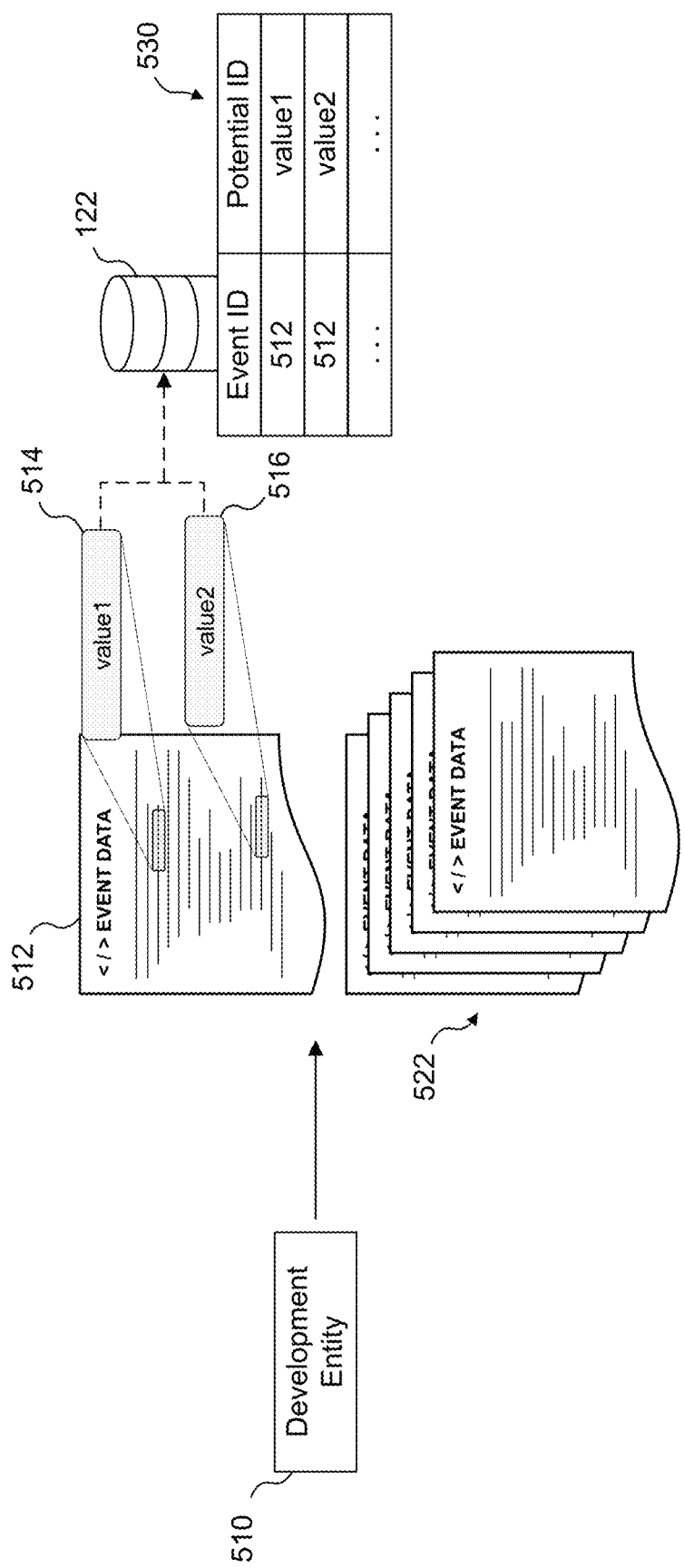
FIG. 5 is a diagrammatic illustration of a technique for dynamically extracting potential identifiers from event data, consistent with the disclosed embodiments.

FIG. 5 is a diagrammatic illustration of a technique for dynamically extracting potential identifiers from event data, consistent with the disclosed embodiments. Server 120 may receive event data 512 representing a software pipeline event associated with development entity 510. This may include receiving event data 512 from development entity 510 or otherwise accessing event data 512. As described above, event data 512 may not include identifiers in a structured manner, or server 120 may not recognize the structure used by development entity 510 to represent identifiers. Accordingly, sever 120 may be configured to identify at least one value as a potential identifier from within event data 512, such as value 514. Value 514 may be identified in various ways. In some embodiments, this may include searching for terms that are unique to event data 512 relative to other event data associated with events from the same development entity. For example, server 120 may access or maintain event data 522 associated with previous events associated with development entity 510. Server 510 may then search event data 512 to identify value 514 that do not appear in any of events data 522. In some embodiments, multiple potential identifiers may be identified from within event data 512. For example, server 120 may identify an additional value 516 as a potential identifier of the code segment.

Server 120 may then store value 514 (and any additional values identified as potential identifiers) in an associative manner with event data 512. For example, this may include storing value 514 in database 112, as indicated in FIG. 5. Value 514 may be stored in any manner such that an association between value 514 and event data 512 can be identified. In some embodiments, this may include an array or table 530, as shown in FIG. 5. For example, value 514 may be stored in one field that is associated with another field indicating event data 512. Table 530 may include other data, such as date and/or time information, an indicator of development entity 510, or any other data. The potential identifiers maybe stored in various other forms of data structures and is not limited to the example table indicated in FIG. 5.

Server 120 may monitor software development events from multiple sources or development entities and maintain a database of potential identifiers. This database may represent values extracted from event data that are unique among event data from the same development entity, as described above. Accordingly, server 120 may maintain a database or other data structure with potential identifiers of different software development events. As additional potential identifiers are captured and identified, they may be compared to the database to determine a match.

Figure 6A:
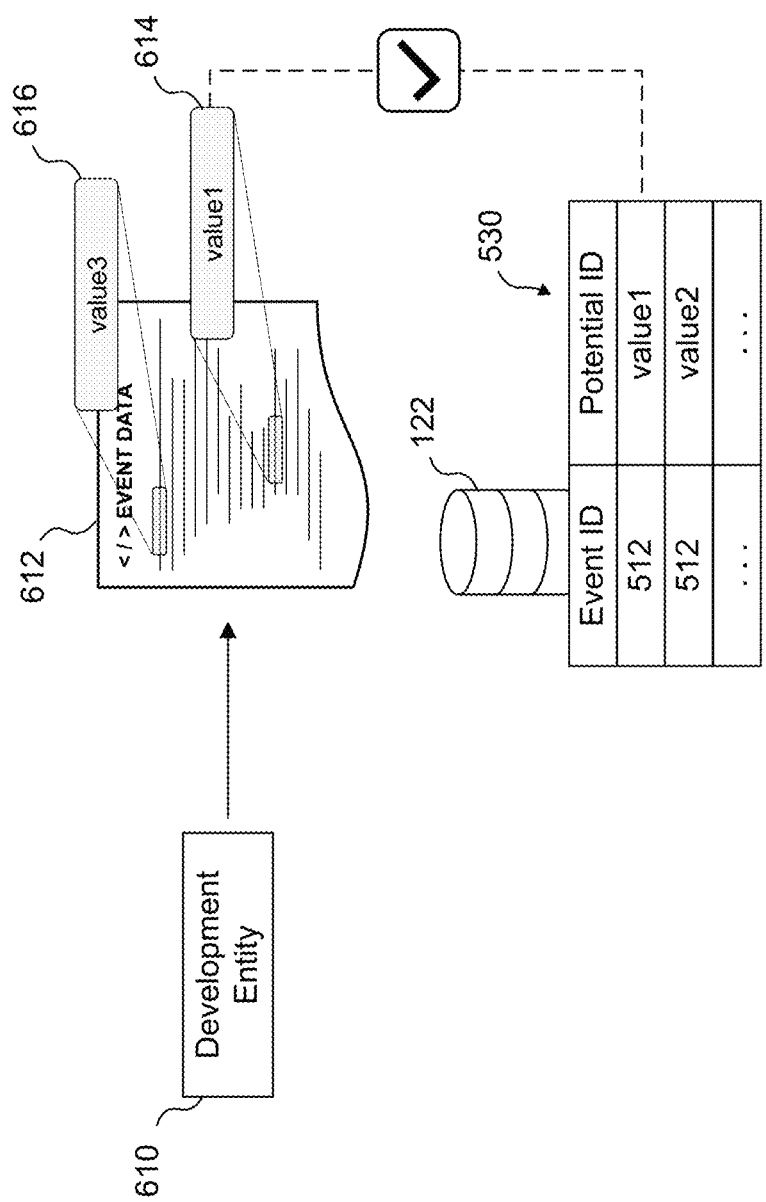
FIGS. 6A and 6B are diagrammatic illustrations of techniques for dynamically determining correlations between software development events, consistent with the disclosed embodiments.

FIG. 6A is a diagrammatic illustration of a technique for dynamically determining correlations between software development events, consistent with the disclosed embodiments. Server 120 may receive event data 612 representing a software pipeline event associated with development entity 610. Similar to event data 512, event data 612 may not include identifiers in a structured manner. Accordingly, sever 120 may be configured to identify at least one value as a potential identifier from within event data 612, such as values 614 and 616. Values 614 and 616 may be values that are not included in other event data associated with development entity 610, as described above with respect to FIG. 5. Server 120 may compare values 614 and 616 to other potential identifiers extracted from event data and stored in database 122. For, example this may include comparing values 614 and 616 to values 514 and 516 stored in table 530. In this example, value 614 may match value 514 extracted from event data 512, as shown in FIG. 6A. Accordingly, server 120 may determine that a correlation exists between the event represented by event data 512 and the event represented by event data 612. Any additional event data including value 514 (or value 614) may also be correlated with the same code segment. This may enable server 120 to establish a unified trace for the code segment through software development pipeline 300 similar to the process described above with respect to FIG. 4, even when identifiers are stored in an unstructured manner.

In some embodiments, server 120 may establish the potential identifier represented by values 514 and 614 as an identifier for a code segment. For example, this may include storing the identified value in a separate data structure for matched identifiers. Alternatively or additionally, this may include designating value 514 within table 530 as being a verified identifier or an identifier for which a match has been determined. In some embodiments, server 120 may discard other values identified as potential identifiers based on a determined correlation. For example, as indicated in FIG. 5, server 120 may identify values 514 and 516 as potential identifiers. Based on value 514 being identified in other event data, such as event data 612, server 120 may determine that value 516 is less likely to be a potential identifier, and may remove it from table 530. In some embodiments, this may include storing value 516 in a separate data structure for future reference.

In some embodiments, this may include determining a confidence score or other metric indicating a degree of confidence that the value represents an identifier. For example, the confidence score may be generated based on a number of events having event data including the value. As the value is found in an increasing number of event data, it may be more likely this value represents an identifier, rather than other text not associated with code segment. The confidence score may be based on various other factors or combinations thereof. In some embodiments, this may include a length of the value. For example, a relatively long text string may be less likely to be an identifier than a text string that is closer to an expected length of an identifier. As another example, the confidence score may be determined based on where the value appears within the event data. For example, an identifier may be more likely to appear at the beginning of the event data than the end (or vice versa). As another example, the identifier may be more likely to appear at the beginning or ending of a line of text, rather than in the middle, etc. Various other factors indicating the likelihood of a value representing an indicator may also be evaluated.

Using the various techniques disclosed herein, server 120 may establish a tracing or chain of events associated with a code segment. This tracing may be used to perform one or more security functions prior to deployment of the code segment or artifact. In some embodiments, this may include validating an artifact prior to deployment. For example, this may include verifying whether a code segment developed through each stage of software development pipeline 300 (or a specified subset of phases). If an artifact was developed in a manner that is missing one or more expected events, it may indicate the artifact was developed maliciously and may have been compromised by an attacker.

Artifacts that cannot be traced through a proper chain of software development pipeline events may be flagged and may trigger various security actions. In some embodiments, this may include generating a report or alert that the artifact cannot be properly validated. This may include transmitting an alert to a user, or other entity indicating the improper validation. The alert may include other information, such as the identifier determined using the methods described above (e.g., value 514), an indication of the determined tracing for the artifact, an indication of a missing event, or the like. As another example, this may include denying deployment of the artifact or requesting additional approval prior to deployment. For example, an administrator or other entity may overrule this feature to enable deployment of the artifact.

The proper chain of events for a particular artifact may be determined in various ways. In some embodiments, a general requirement may apply to all artifacts. For example, a proper development chain may include at least a source code event, a build event, and an artifactory event, or any other suitable chain of development events. In some embodiments, the proper chain may be defined based on a security policy. For example, an organization may define a policy requiring specific security checks (e.g., provided using Snyk™, Checkmarx™, or other security tools). This may include enforcing a policy to only deploy artifacts that have been approved by a particular security tool, etc. Accordingly an artifact may be deployed based on the inclusion of one or more particular events (e.g., security events, etc.) within the determined tracing. In some embodiments, the proper chain of events may vary depending on the artifact. For example, artifacts having a high security impact may have more stringent requirements than artifacts with relatively low security impacts. The security impact for an artifact may be determined in various ways. For example, this may include a type of software associated with the artifact, a number of users or machines to which the artifact will be deployed, a security clearance or privilege level associated with the artifact, or the like.

As an alternative to or in addition to the validation described above, server 120 may be configured to detect one or more anomalies associated with an artifact. For example, even though an artifact may have been developed such that it includes each of the expected software pipeline events, it may have other properties or attributes that may indicate it is malicious. Accordingly, server 120 may search for any attributes representing outliers from expected or historical attributes. In some embodiments the attribute may include a size of the execution. For example, if the chain of events is abnormally long or abnormally short, this may be identified as an anomaly. As another example, the attribute may be a time stamp associated with one or more events. For example, if the timing between events is abnormally long or abnormally short, this may be flagged as an anomaly. In some embodiments, an anomaly may be detected based on identifiers associated with an attribute. For example, if there is another artifact having the same name but using different identifiers, this may indicate that at least one of the artifacts is anomalous. Based on the detection of an anomaly, server 120 may take one or more security actions, including those described above with respect to validation of a chain of events. For example, this may include generating an alert, denying deployment, requesting approval for deployment, or the like.

In some embodiments, anomalies may be detected using one or more trained machine learning models. For example, a model may be trained to analyze tracings for a particular artifact and identify any anomalous attributes of the tracing. This may include inputting a set of artifact tracings along with indications of whether the tracings represent anomalous activity, into a machine learning model as training data. The resulting trained model may be used to analyze subsequent artifact tracings to identify suspicious or malicious activity. For example, an artificial neural network configured to identify malicious activity for an artifact. Various other machine learning algorithms may be used, including a logistic regression, a linear regression, a regression, a random forest, a K-Nearest Neighbor (KNN) model, a K-Means model, a decision tree, a cox proportional hazards regression model, a Naïve Bayes model, a Support Vector Machines (SVM) model, a gradient boosting algorithm, a deep learning model, or any other form of machine learning model or algorithm.

As described above, a software pipeline event may include any event associated with the development of software. In some embodiments, the software pipeline event may not be tied to a specific code segment but may be associated with software development more generally, such as an event associated with a network entity involved in development of software. For example, a software pipeline event may be a security-related event associated with sensitive information, such as the use of a token, security key, or other credential, accessing a secure file, or the like. Using the embodiments described herein, correlations between these types events may be identified in a similar way. Accordingly, chains of security-related events may be identified, which may be used, for example, to identify attacks such as credential theft attacks.

Figure 6B:
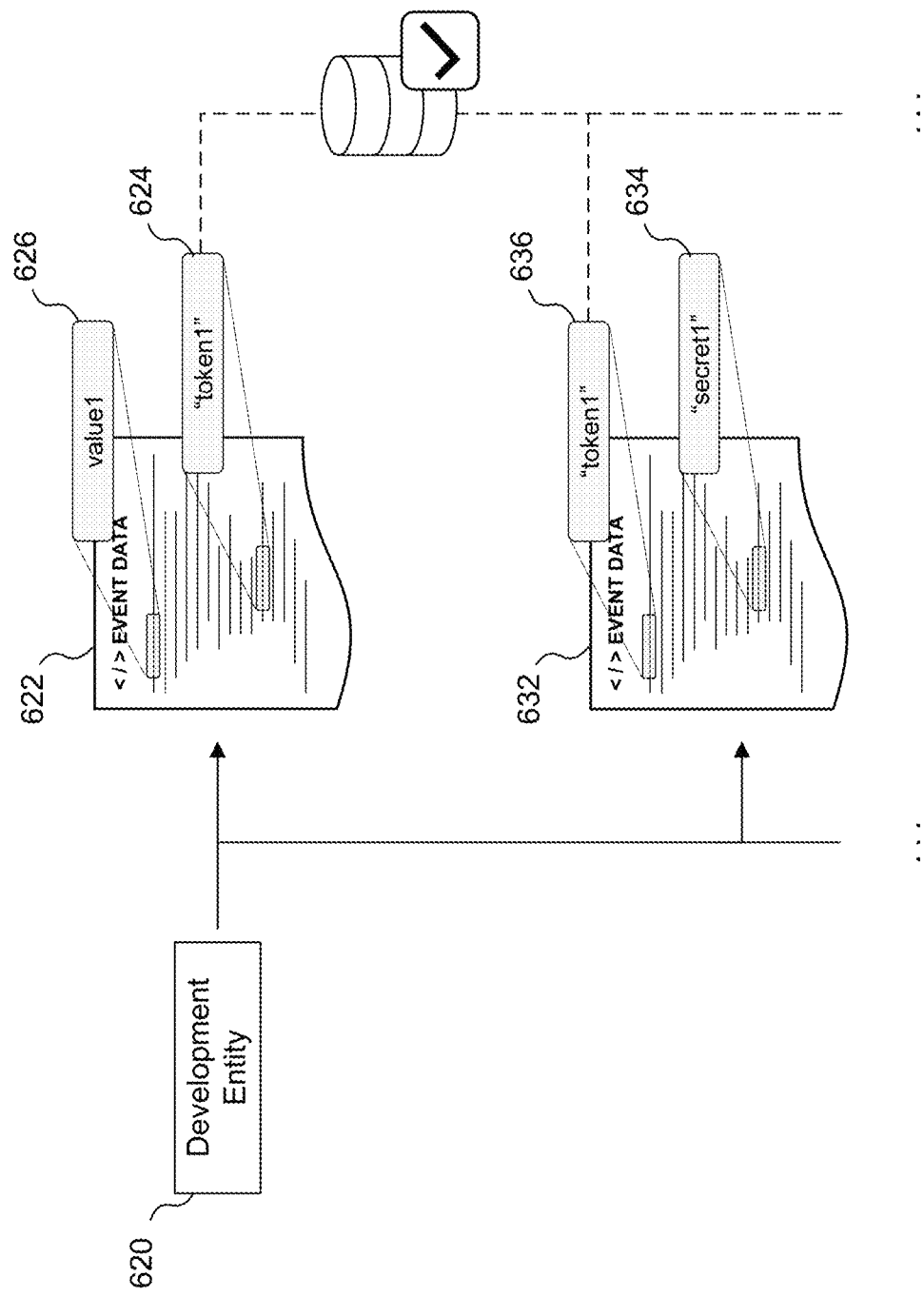

FIG. 6B is a diagrammatic illustration of another technique for dynamically determining correlations between software development events, consistent with the disclosed embodiments. As shown in FIG. 6B, server 120 may receive event data 622 and 632 representing a software pipeline event associated with development entities 620 and 630. In this example, event data may be associated with accessing sensitive information, as described above. For example, event data 622 may be associated with creation of a credential by a network identity. As used herein, a network identity may include any identity (e.g., a user, an account, an organization, etc.) that may access system 100. As described above, a development entity may include a computing device of a user involved in developing software. Accordingly, event data 622 may reflect a creation of a credential by a user. While creation and/or use of a credential is provided by way of example, it is to be understood that software pipeline events may include a wide variety of other events.

Similar to event data 612, event data 622 may not include identifiers in a structured manner. Accordingly, sever 120 may be configured to identify at least one value as a potential identifier from within event data 622, such as values 624 and 626. Values 624 and 626 may be values that are not included in other event data associated with development entity 620, as described above with respect to FIG. 5. In this example, one or more values may be associated with creation of a credential, such as a token. For example, value 624 may be a name or other identifier of a token created by a network identity. Server 120 may store values 624 and 626 as potential event identifiers in database 122, as described above with respect to FIG. 5. While event data 622 and 623 are shown as being received from the same development entity 620, this may not necessarily be true and they may be received from different development entities.

Event data 622 and 632 may be received in various ways. As described above, development entity 620 may be associated with a third party vendor using tools for managing a particular aspect of a software development pipeline. For example, development entity 620 may be a source control system (e.g., GitHub™, GitLab™, BitBucket™, AWS CodeCommit™, etc.) a build vendor (e.g., Jenkins™, CircleCI™, AWS CodeBuild™, etc.), an artifact server (e.g., JFrog Artifactory™ Amazon™ Elastic Container Registry (ECR)™, ProGet™, etc.), a code scanner (e.g., Snyk™, CheckMarx™, etc.), or various other pipeline software tools. In some embodiments, a custom HTTP callback or a "webhook" may be defined by a user to identify credential creation events (or various other events) in association with the pipeline software tool. Accordingly, event data 622 may be received based on a webhook being triggered.

As another example, development entity 620 may include a computing device associated with the network identity. For example, development entity 620 may be a desktop or laptop computer used by a network identity for accessing and modifying software code. In some embodiments, event data 622 may be received from an agent executing on a computing device of the network identity. For example, an agent running on the network identity device may communicate with server 120 through one or more API calls to identify event data 622 and/or 632. As another example, a "tracer" may be implemented as an executable on the network identity device that runs inside a virtual computing instance that executes the network identity's build. As used herein, a virtual computing instance may be a virtual machine, a container instance, a cloud function or any other form of virtual instance that may run code. Accordingly, the agent may identify and report these forms of software pipeline events.

Server 120 may compare values 624 and 626 to other potential identifiers extracted from event data and stored in database 122. For, example event data 632 may reflect a use of the credential created in association with event data 622 to access a secret. As shown in FIG. 6B, event data 632 may include values 624 and 634. Value 636 may be the same as value 624 and may indicate that the token created previously was used to access a secret. In this example, value 634 may be a name of the secret accessed. For example, value 634 may be the name of an environment variable accessed using the token. Various other secrets may be accessed, such as a privileged file, a privileged code segment, privileged software, or any other data that may be restricted in some way.

Server 120 may compare values extracted from event data 622 and 632 stored in table 530. In this example, value 636 may match value 624, as shown in FIG. 6B. Accordingly, server 120 may determine that a correlation exists between the event represented by event data 622 and the event represented by event data 632. This may enable server 120 to establish a unified trace for a chain of events, similar to the chain of events described above with respect to FIG. 4, even when identifiers are stored in an unstructured manner. This may also include correlating credential 624 and secret 634 with the network identity that created the credential.

In some embodiments, this correlation between two or more events may be used to identify potential attacks, such as an attempt to improperly gain access to a secret. For example, a user may generate a credential through one development entity and may attempt to use it in another context (e.g., accessing a secure resource, encrypting sensitive information, etc.). Under conventional systems, this form of attack may be missed due to the variations in how events 622 and 632 are recorded. However, using the embodiments described herein, this chain of events can be identified and addressed.

While generation of a credential is described by way of example, various other forms of events may be correlated to identify potential security issues. In some embodiments, event 622 may include a change in a security configuration associated with accessing a privileged resource. For example, a network entity may change a requirement for multi-factor authentication or any other aspect of a security configuration that may affect access to the privileged resource. In this example, value 624 may include a name of the security aspect that is changed, a name of the privileged resource, a name of a credential used to change the security configuration, or the like. Event 632 may include access to the privileged resource after the change in the security configuration. For example, if the same entity (or a different entity) accesses the privileged resource shortly after the change (i.e., within a predetermined time period), this may indicate suspicious activity. The two events may be correlated based on a match between value 624 and value 636 (i.e., the same value occurring in both events), which may allow this form of attack to be detected.

As another example, event 622 may include an installation of an executable or dependency in the flow of a software pipeline. For example, the executable may be a plug-in (e.g., a Jenkins™ plug-in or similar plug-in) installed by a network identity. Event 632 may include an operation performed by the executable. For example, a plug-in may attempt to send a message to a suspicious IP address (e.g., an unknown or unrecognized IP address; a blacklisted IP address, etc.). In this example, value 624 (and value 636) may include a name or other identifier of the executable, a name of the network identity that installed the executable, or any other information that may be included in event data associated with events 622 and 632. In some embodiments, a chain of events associated with the installation of the executable may be identified and traced back to the network identity that installed the executable. One skilled in the art would recognize various other combinations of events 622 and 632 that may be detected using the techniques described herein.

In some embodiments, sever 120 may cause a control action to be performed. For example, this may include generating a report indicating the correlation exists, triggering an alert, validating credential 624, revoking a privilege of the network entity, cycling a credential of the network identity, or various other control actions to address a potential attack.

Figure 7:
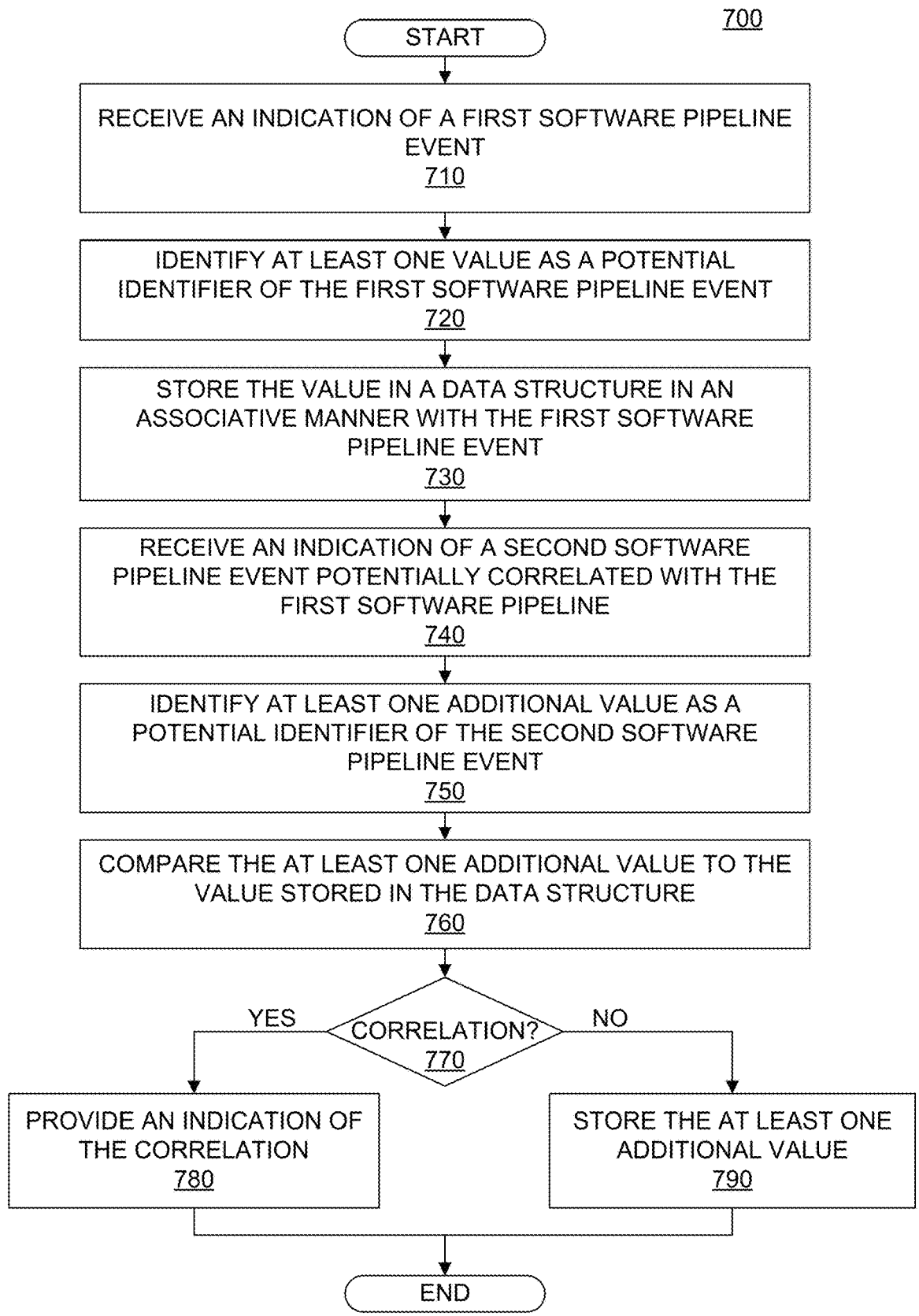
FIG. 7 is a flowchart showing an example process for correlating software pipeline events, consistent with the disclosed embodiments.

FIG. 7 is a flowchart showing an example process 700 for correlating software pipeline events, consistent with the disclosed embodiments. Process 700 may be performed by at least one processing device of a server, such as processor 210, as described above. It is to be understood that throughout the present disclosure, the term "processor" is used as a shorthand for "at least one processor." In other words, a processor may include one or more structures that perform logic operations whether such structures are collocated, connected, or disbursed. In some embodiments, a non-transitory computer readable medium may contain instructions that when executed by a processor cause the processor to perform process 700. Further, process 700 is not necessarily limited to the steps shown in FIG. 7, and any steps or processes of the various embodiments described throughout the present disclosure may also be included in process 700, including those described above with respect to, for example, FIGS. 4, 5, 6A, and 6B.

In step 710, process 700 may include receiving an indication of a first software pipeline event. In some embodiments, the first software pipeline event may be associated with a code segment. Alternatively or additionally, the first software pipeline event may be associated with a network identity associated with development of one or more code segments. The indication of the first software pipeline event may include first data representing at least one aspect of the first software pipeline event. For example, step 710 may include receiving event data 512, as described above. The first software pipeline event may be received in various ways. For example, the indication of the first software pipeline event may be based on a custom HTTP callback, as described above. As another example, the indication of the first software pipeline event may be received from an agent executing on a computing device of the network identity associated with the first software pipeline event. For example, the indication of the first software pipeline event may be received from the agent through an API call. Alternatively or additionally, the agent may be running in a virtual computing instance executing a code segment. In some embodiments, the first software pipeline event may include creation of a credential by a network identity. For example, the first software pipeline event may include creation of a token or another form of credential. As another example, the first software pipeline event may include a change in a security configuration of a privileged resource. For example, the first software pipeline event may include a change in a multi-factor authentication requirement or any other aspect of a security configuration. As another example, the first software pipeline event may include an installation of at least one of an executable or a dependency. For example, the first software pipeline event may include the installation of a plug-in by a network identity.

In step 720, process 700 may include identifying at least one value as a potential identifier of the first software pipeline event. For example, this may include identifying value 514, as described above with respect to FIG. 5. In some embodiments, the at least one value may be a value not included in other event data associated with the same development entity. For example, the first software pipeline event may be associated with a first source, such as development entity 510. Identifying the at least one value may include determining that the at least one value is not included in data representing at least one additional software pipeline event associated with the first source. For example, this may include determining that value 514 is not included in event data 522, as described above. In embodiments where the first software pipeline event includes creation of a credential by a network identity, the at least one value may be a name of the credential, or any other form of identifier of the credential.

In step 730, process 700 may include storing the value in a data structure in an associative manner with the first software pipeline event. For example, this may include storing value 514 in table 530, as described above. The data structure may be represented in various formats, such as a table, an array, a list, or any other data format suitable for storing data in an associative manner.

In step 740, process 700 may include receiving an indication of a second software pipeline event potentially associated with the code segment (or at least potentially correlated with the first software pipeline event). Similar to the first software pipeline event, the indication of the second software pipeline event may include second data representing at least one aspect of the second software pipeline event. For example, this may include receiving or accessing event data 612, as described above. In some embodiments, the first and second software events may be associated with different development entities (or sources). Accordingly, the first software pipeline event may be associated with a first source and the second software pipeline event may be associated with a second source, the second source being different from the first source. In some embodiments, the first source and the second source may be associated with different phases of software development. In some embodiments, the second software pipeline event may include a use of a credential. For example, in embodiments where the first software pipeline event includes creation of a credential by a network identity, the use of the credential may include using the credential to access a privileged resource using the credential. For example, a privileged resource may include an environment variable and the at least one additional value may include a name of the environment variable.

The second software pipeline event may include use of the credential to access various other forms of secrets or sensitive information. For example, this may include use of the credential to access sensitive data stored in a privileged data storage location. As another example, this may include use of a credential to encrypt sensitive data. For example, the credential may be associated with an administrator role or other role enabling encryption of sensitive data which may be performed as part of a Denial-of-Service (DoS) and/or ransomware attack.

As another example, in embodiments where the first software pipeline event includes a change in a security configuration of a privileged resource, the second software pipeline event may include access to the privileged resource within a predetermined timeframe of the change in the security configuration. As another example, the first software pipeline event may include an installation of an executable, as described above. Accordingly, the second software pipeline event may include an operation performed by the executable.

In step 750, process 700 may include identifying at least one additional value as a potential identifier of the second software pipeline event. The at least one additional value may be identified from within the second data representing the at least one aspect of the second software pipeline event. For example, this may include identifying value 614, as described above with respect to FIG. 6A. In some embodiments, the at least one additional value may be a value not included in other event data associated with the same development entity. For example, the second software pipeline event may be associated with a second source, such as development entity 610. Identifying the at least one additional value may include determining that the at least one value is not included in data representing at least one additional software pipeline event associated with the second source.

In step 760, process 700 may include comparing the at least one additional value to the value stored in the data structure. For example, this may include comparing value 614 to value 514 stored in table 530, as described above.

In step 770, process 700 may include determining whether a correlation exists between the first software pipeline event and the second software pipeline event. The determination may be based on the comparison between the at least one value and the at least one additional value from step 760. In some embodiments, this may not require an exact match between the at least one value and the at least one additional value. For example, step 770 may include determining that the at least one value and the at least one additional value differ by less than a threshold amount, or the like.

In step 780, based on a determination that a correlation exists, process 700 may include providing an indication of the correlation. The indication of the correlation may be provided in various ways. In some embodiments, this may include designating the at least one value as an identifier associated with the code segment. For example, this may include designating value 514 as an identifier of the code segment. In some embodiments, this may include removing the at least one value from the data structure. For example, value 514 may no longer be considered a potential identifier as it may have been positively identified as an identifier. In some embodiments, step 780 may further include storing the at least one value in a separate data structure in an associative manner with the first software pipeline event and the second pipeline event, the separate data structure being distinct from the data structure. For example, server 120 may maintain a separate data structure for storing matched identifiers.

In some embodiments, step 780 may further include discarding values not determined to be an identifier. For example, the at least one value may include at least a first value and a second value. Accordingly step 760 may include comparing the additional value to the first value and the second value stored in the data structure. Step 780 may include discarding the second value based on the correlation between the first software pipeline event and the second software pipeline resulting from the comparison between the first value and the additional value.

In some embodiments, portions of process 700 may be repeated for additional software pipeline events. For example, process 700 may include receiving an indication of a third software pipeline event associated with the code segment, the indication of the third software pipeline event including third data representing at least one aspect of the third software pipeline event. Process 700 may include searching the third data to identify the at least one value within the third data and determining a correlation between the first software pipeline event and the third software pipeline event based on the at least one value being included in the third data.

In some embodiments, process 700 may further include various steps to validate a series of events once a correlation has been determined, which may ensure the proper chain of events were followed and the process was not compromised. For example, although two or more software pipeline events have been correlated, this correlation may not necessarily indicate a proper chain of events was followed. Accordingly, process 700 may include a validation step to verify the proper chain of events occurred prior to deployment of a code segment.

As one example, the correlated events may indicate that the system has not identified an answer from a scanning tool that must be implemented according to a particular policy. This may include, for example, a scanning tool such as Snyk™, which may scan the package for known vulnerabilities or associated malicious activity. If a Snyk™ "greenlight" event indicating no issues were found as part of the scan is missing from the chain of events, this may indicate that the scanning tool was overridden by an attacker or that other malicious activity may have occurred. In this example, a chain of events that does not include events from the scanning tool may not be validated by the system. As another example, the system may use the database of corelated events to include integrity and consistency checks over an entire software development pipeline. For example, if a hash checked into the artifact manager (such as JFrog™) does not match the artifact that was actually deployed into production, the system may create an alert or fail the deployment. Various other control actions that may be taken in response to a failed validation or other anomaly are described below.

In step 790, based on a determination that a correlation does not exist, process 700 may include storing the at least one additional value in the data structure in an associative manner with the second software pipeline event. For example, this may include storing values 614 and 616 in table 530 to indicate they are associated with event data 612. Accordingly, values 614 and 616 may be compared to subsequent values identified as potential identifiers.

In some embodiments, process 700 may include various security functions as described above. For example, process 700 may further include allowing deployment of the code segment for production based on the determined correlation. Alternatively or additionally, process 700 may include performing at least one control action based on at least one of a detected anomaly or a predefined rule. For example, the predefined rule may include a requirement that one or more specified stages of a software development pipeline are completed. As another example, a rule may require that a code segment be reviewed and/or approved, which may create a software pipeline event associated with the review and/or approval. When code is merged into a source control platform (e.g., GitHub™, etc.) that was not reviewed and approved, a control action may be performed. As another example, a policy may include a web hook that will enable a policy enforcement on the source control, such as a pre-commit hook, an API, or the like. In some embodiments, the detected anomaly may include an indication of at least one of an irregular size, an irregular time stamp, or an artifact included in at least one of the first data or the second data. In some embodiments, the anomaly may be detected using an artificial intelligence model, as described above.

Various forms of control actions may be implemented. For example, the control action may include generating a report indicating the correlation does not exist. Alternatively or additionally, the control action may include denying a deployment of the code segment. In some embodiments, the control action may include application of at least one policy prior to deployment of the code segment. In some embodiments, the control action may be an alert that is generated based on whether an anomaly is detected or a predefined rule has been violated. The alert may be presented in a dashboard of the system, transmitted to a system administrator or other user, or the like. For example, the alert may indicate whether a correlation was determined for one or more software pipeline events, whether an anomaly was detected, whether a rule was violated, or the like. In some embodiments, the control action may include generating a report, which may include a list software pipeline events that have been correlated with other software pipeline events, a list of software pipeline events that have not been correlated, a list of code segments associated with correlated software pipeline events that indicate an anomaly or that a rule was not followed, or various other information. As another example, the control action may include generating a query for input from an administrator or other user. For example, despite an anomaly being detected or a rule not being followed, an administrator may indicate that a code segment should be deployed despite the detected anomaly or rule violation. Accordingly, the control action may be a query to the administrator as to whether to override the policy violation and deploy the code segment. Various other control actions may be implemented as described herein. In embodiments where the first software pipeline event includes creation of a credential by a network identity (or similar events associated with a network identity), the control action may include generating a report indicating the correlation exists, triggering an alert, validating the credential, revoking a privilege of the network entity, rotating a credential of the network identity, or various other control actions to address a potential attack.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for correlating software pipeline events, the operations comprising:
    receiving an indication of a first software pipeline event, the indication of the first software pipeline event including first data representing at least one aspect of the first software pipeline event;
    identifying at least one value as a potential identifier of the first software pipeline event;
    storing the at least one value in a data structure in an associative manner with the first software pipeline event;
    receiving an indication of a second software pipeline event correlated with the first software pipeline event, the indication of the second software pipeline event including second data representing at least one aspect of the second software pipeline event;
    identifying at least one additional value as a potential identifier of the second software pipeline event;
    comparing the at least one additional value to the at least one value stored in the data structure;

based on the comparison between the at least one value and the at least one additional value, determining whether a correlation exists between the first software pipeline event and the second software pipeline event; and based on a determination that a correlation exists, providing an indication of the correlation.

2. The non-transitory computer readable medium of claim 1, wherein the indication of the first software pipeline event is based on a custom HTTP callback.

3. The non-transitory computer readable medium of claim 1, wherein the indication of the first software pipeline event is received from an agent executing on a computing device of the network identity associated with the first software pipeline event.

4. The non-transitory computer readable medium of claim 3, wherein the indication of the first software pipeline event is received from the agent through an API call.

5. The non-transitory computer readable medium of claim 4, wherein the agent is running in a virtual computing instance executing a code segment.

6. The non-transitory computer readable medium of claim 1, wherein the first software pipeline event includes a creation of a credential by a network identity.

7. The non-transitory computer readable medium of claim 6, wherein the credential is a token.

8. The non-transitory computer readable medium of claim 6, wherein the at least one value includes at least one of a name of the credential or an identifier of the credential.

9. The non-transitory computer readable medium of claim 6, wherein the second software pipeline event includes a use of the credential.

10. The non-transitory computer readable medium of claim 9, wherein the use of the credential includes using the credential to access a privileged resource using the credential.

11. The non-transitory computer readable medium of claim 10, wherein the at least one additional value includes a name of the privileged resource.

12. The non-transitory computer readable medium of claim 1, wherein the first software pipeline event includes a change in a security configuration of a privileged resource.

13. The non-transitory computer readable medium of claim 12, wherein the second software pipeline event includes access to the privileged resource within a predetermined timeframe of the change in the security configuration.

14. The non-transitory computer readable medium of claim 1, wherein the first software pipeline event includes an installation of at least one of an executable or a dependency.

15. The non-transitory computer readable medium of claim 1, wherein the second software pipeline event includes an operation performed by the executable.

16. The non-transitory computer readable medium of claim 1, wherein the first software pipeline event is associated with a first source and wherein identifying the at least one value includes determining that the at least one value is not included in data representing at least one additional software pipeline event associated with the first source.

17. A computer-implemented method for correlating software pipeline events, the method comprising:
receiving an indication of a first software pipeline event, the indication of the first software pipeline event including first data representing at least one aspect of the first software pipeline event;
identifying at least one value as a potential identifier of the first software pipeline event;
storing the at least one value in a data structure in an associative manner with the first software pipeline event;
receiving an indication of a second software pipeline event correlated with the first software pipeline event, the indication of the second software pipeline event including second data representing at least one aspect of the second software pipeline event;
identifying at least one additional value as a potential identifier of the second software pipeline event;
comparing the at least one additional value to the at least one value stored in the data structure;
based on the comparison between the at least one value and the at least one additional value, determining whether a correlation exists between the first software pipeline event and the second software pipeline event; and
based on a determination that a correlation exists, providing an indication of the correlation.

18. The computer-implemented method of claim 17, wherein the at least one value includes at least a first value and a second value and wherein comparing the at least one additional value to the at least one value stored in the data structure includes comparing the at least one additional value to the first value and the second value stored in the data structure.

19. The computer-implemented method of claim 18, further comprising discarding the second value based on the correlation between the first software pipeline event and the second software pipeline resulting from the comparison between the first value and the additional value.

20. The computer-implemented method of claim 17, further comprising performing at least one control action based on the determination that a correlation exists.

21. The computer-implemented method of claim 20, wherein the control action includes at least one of generating a report indicating the correlation exists or triggering an alert.

22. The computer-implemented method of claim 20, wherein the first software pipeline event includes creation of a credential by a network identity, and the second software pipeline event includes a use of the credential by the network identity.

23. The computer-implemented method of claim 22 wherein the control action includes at least one of revoking a privilege of the network entity or performing a validation of the credential.

* * * * *